Dec. 21, 1926. 1,611,598
H. S. LINDHARDT
DRIVING ARRANGEMENT FOR MOTOR LOCOMOTIVE ENGINES AND THE LIKE
Filed April 6, 1926
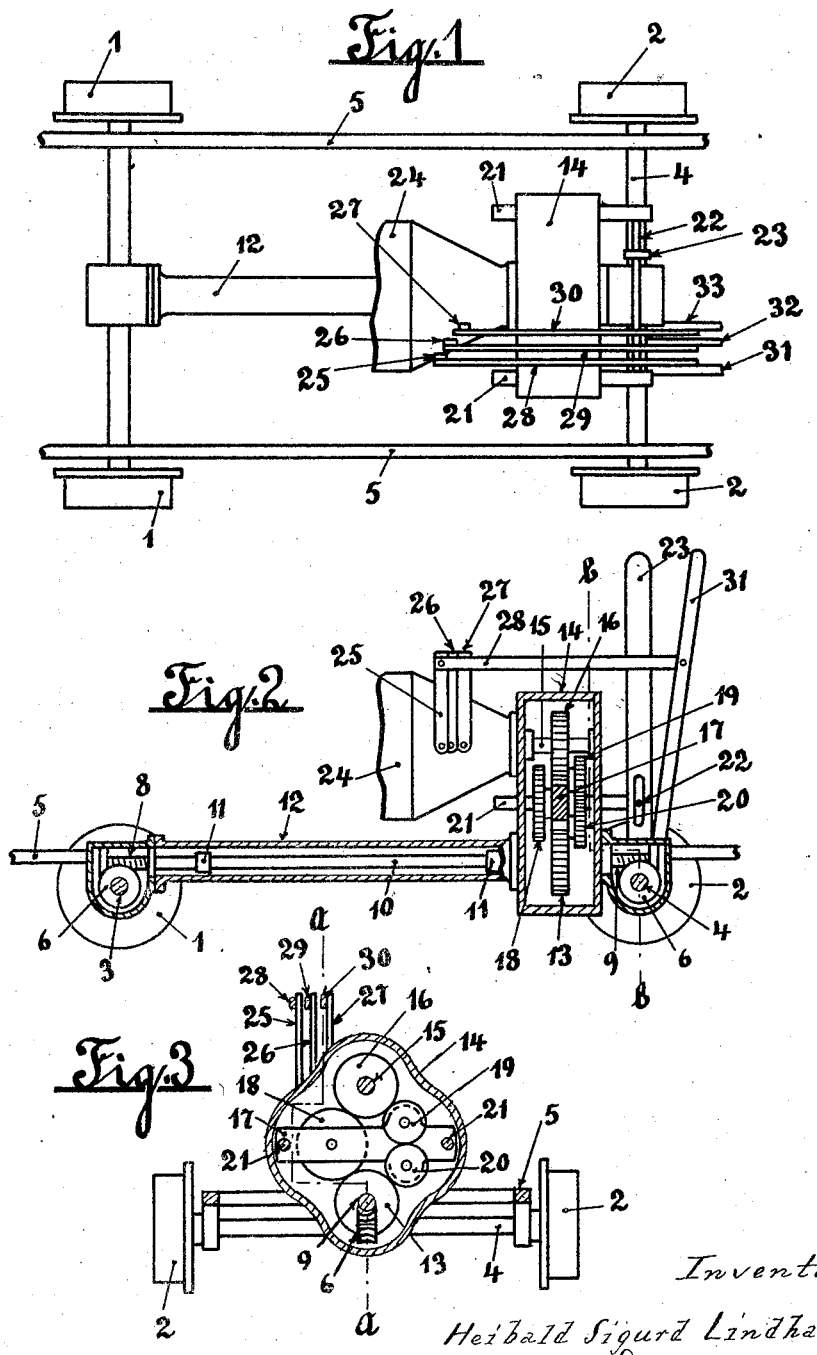
Inventor:
Heibald Sigurd Lindhardt Patented Dec. 21, 1926.

1,611,598

UNITED STATES PATENT OFFICE.

HEIBALD SIGURD LINDHARDT, OF AALBORG, DENMARK.

DRIVING ARRANGEMENT FOR MOTOR LOCOMOTIVE ENGINES AND THE LIKE.

Application filed April 6, 1926, Serial No. 100,193, and in Denmark March 20, 1925.

By the motor locomotive engines known till now chain-pulling has been used for the transfer of the motor power to the engine wheels, which is a drawback as this does not give a safe and reliable transfer. By means of the present invention considering a driving regulation for motor locomotive engines and the like this drawback is avoided. Besides it has the advantage of being able to drive with various degrees of speed in both directions.

The drawing is shown in:

Fig. 1 the lower part of a locomotive according to the invention seen from above.

Fig. 2 a section on the line a—a in Fig. 3, and

Fig. 3 a section on the line b—b in Fig. 2.

1 and 2 are ordinary railway wheels, fastened to axles 3 and 4, which are placed on a frame 5. To the axles 3 and 4 worm-wheels 6 are fastened, which mesh with its worms 8 and 9. The worms are mutually combined with an intermediate shaft 10. The combination between the worms 8 and 9 and the intermediate shaft takes place by means of coupling-boxes 11, which allow a small curve on the axle 10 between the worms and axles. The intermediate shaft and a part of the worms are covered by a tube 12 to protect the parts of the engine against dirt. To the axle 10 a cog-wheel 13 is fastened. A cog-wheel 16 is fastened to a revolving-axle 15 placed in a casing 14. The axle 15 is combined with the axle in an ordinary gear-case 24. Within the casing 14 a plate 17 is placed, to which on one side a revolving cog or gear-wheel 18 is placed and on the other side two revolving cog or gear-wheels 19 and 20 are provided, which mesh with each other. The plate is fastened to two bars 21 which slide backward and forward in the casing 14. The bars 21 are mutually combined with a bar or rod 22 so that the bars 21 may be pushed to and fro by a hand lever 23. By pushing the plate 17 forward the cog-wheels 19 and 20 mesh with the cog-wheels 13 and 16, whereby the wheels 1 and 2 will be rotated in one direction. Upon pushing the plate backwards the cog-wheels 19 and 20 are first loosened from the cog-wheels 13 and 16 after which, the plate being pushed still further, the cog-wheel 18 will mesh with the cog-wheels 13 and 16 so that the wheels 1 and 2 will now rotate in the opposite direction.

25 is a lever by which the engine is given two different degrees of speed in the same direction. By another lever 26 a third degree of speed can be obtained, but this will be in the opposite direction unless the cog-wheel 18 is pushed out of engagement with the cog-wheels 13 and 16, and the cog-wheels 19 and 20 are pushed into mesh with these cog-wheels. There are consequently three degrees of speed in one direction, but the same three degrees of speed can be obtained in the opposite direction for the engine by the throwing in or out of the cog-wheels 19 and 20 and the plate 17. 27 is a lever by which the engine is given a braking effect. The levers 25, 26 and 27 are through the connecting rods 28, 29 and 30 combined with the hand-levers 31, 32 and 33 respectively.

I claim as my invention:—

1. A reversing mechanism for motor driven locomotives comprising a driving shaft for the wheels of the locomotive; a cog-wheel secured on said shaft; an axle adapted to be driven by the motor of the locomotive; a cog-wheel secured on the axle; a casing; a plate in said casing; a freely-revolving gear wheel mounted on one side of said plate; a pair of freely revolving gear wheels mounted on the other side of said plate, said pair of gear wheels meshing with one another; and means for actuating the plate in order that the single gear wheel or the pair of gear wheels, depending upon the direction of rotation to be imparted to the locomotive wheels, shall mesh with both of said cog-wheels.

2. A reversing mechanism for motor driven locomotives comprising a driving shaft for the wheels of the locomotive; a casing; a cog-wheel secured on said shaft; an axle adapted to be driven by the motor of the locomotive; a cog-wheel in said casing secured on the axle; a plate in said casing; means for slidably mounting said plate in said casing; a freely-revolving gear wheel mounted on one side of said plate; a pair of freely-revolving gear wheels mounted on the other side of said plate, said pair of gear wheels meshing with one another; and means for actuating said plate in order that the single gear wheel or the pair of gear wheels, depending upon the direction of rotation to be imparted to the locomotive wheels, shall mesh with both of said cog-wheels.

3. A reversing mechanism for motor driven locomotives comprising a driving shaft for the wheels of the locomotive; a casing; a cog-wheel secured on said shaft; an axle adapted to be driven by the motor of the locomotive; a cog-wheel in said casing secured on the axle; a pair of bars slidably mounted in said casing; a plate mounted on said bars; a freely-revolving gear wheel mounted on one side of said plate; a pair of freely-revolving gear wheels mounted on the other side of said plate, said pair of gear wheels meshing with one another; and means for actuating said bars in order to actuate the plate so that the single gear wheel or the pair of gear wheels, depending upon the direction of rotation to be imparted to the locomotive wheels, shall mesh with both of said cog-wheels.

4. A reversing mechanism for motor driven locomotives comprising a driving shaft for the wheels of the locomotive; a casing; a cog-wheel secured on said shaft; an axle adapted to be driven by the motor of the locomotive; a cog-wheel in said casing secured on the axle; a pair of bars slidably mounted in said casing; a plate mounted on said bars; a freely-revolving gear wheel mounted on one side of said plate; a pair of freely-revolving gear wheels mounted on the other side of said plate, said pair of gear wheels meshing with one another; a rod secured to and connecting said bars together; and a lever cooperating with said rod for slidably adjusting said plate so that the single gear wheel or the pair of gear wheels, depending upon the direction of rotation to be imparted to the locomotive wheels, shall mesh with both of said cog-wheels.

5. A reversing mechanism for motor driven locomotives comprising a driving shaft for the wheels of the locomotive; a cog-wheel secured on said shaft; an axle adapted to be driven by the motor of the locomotive; a cog-wheel secured on the axle; a plate; a freely-revolving gear wheel mounted on one side of said plate; a pair of freely-revolving gear wheels mounted on the other side of said plate and meshing with one another; and means for actuating the plate in order that the single gear wheel or the pair of gear wheels, depending upon the direction of rotation to be imparted to the locomotive wheels, shall mesh with both of said cog-wheels.

In testimony whereof I affix my signature.

HEIBALD SIGURD LINDHARDT.